United States Patent [19]
Doyle

[11] Patent Number: 5,201,691
[45] Date of Patent: Apr. 13, 1993

[54] VARIABLE SPEED TRANSMISSION ASSEMBLY

[75] Inventor: James V. Doyle, Wexford, Ireland

[73] Assignee: Doyle Transmissions Limited, Coolballow, Ireland

[21] Appl. No.: 781,856

[22] Filed: Oct. 24, 1991

[30] Foreign Application Priority Data

| Nov. 7, 1990 | [IE] | Ireland | 1647/90 |
| Nov. 21, 1990 | [IE] | Ireland | 4202/90 |
| Aug. 20, 1991 | [IE] | Ireland | 2942/91 |

[51] Int. Cl.⁵ .................... F16H 47/04; F16H 37/00
[52] U.S. Cl. .......................... 475/53; 475/72; 475/210; 475/211
[58] Field of Search ............ 475/35, 36, 40, 47, 475/53, 72, 198, 207, 210, 211

[56] References Cited

U.S. PATENT DOCUMENTS

| H398 | 1/1988 | Lemieux et al. | 475/53 X |
| 3,605,522 | 11/1968 | Grosseau | 475/53 |
| 4,672,861 | 6/1987 | Lanzer | 475/199 X |
| 4,936,165 | 6/1990 | Doyle et al. | 475/211 X |
| 4,994,002 | 2/1991 | Valotto et al. | 475/72 |
| 5,005,442 | 4/1991 | Sakakibara et al. | 74/866 |
| 5,024,633 | 6/1991 | Schmidt | 475/72 |
| 5,092,824 | 3/1992 | Connett | 475/72 |
| 5,113,723 | 5/1992 | Ishino et al. | 475/72 |

FOREIGN PATENT DOCUMENTS

| 56-49456 | 5/1981 | Japan | 475/211 |
| 56-52653 | 5/1981 | Japan | 475/211 |
| 62-113960 | 5/1987 | Japan | 475/72 |
| 1-320370 | 12/1989 | Japan | 475/210 |
| 2-8541 | 1/1990 | Japan | 475/210 |
| 2-186158 | 7/1990 | Japan | 475/210 |
| 910653 | 3/1959 | United Kingdom | 475/72 |
| 967328 | 8/1964 | United Kingdom | 475/72 |
| 2011561 | 7/1979 | United Kingdom | 475/72 |
| 2113324 | 1/1980 | United Kingdom . | |
| 2025545 | 8/1983 | United Kingdom . | |

Primary Examiner—Rodney H. Bonck
Assistant Examiner—Ryan W. Massey
Attorney, Agent, or Firm—Scully, Scott, Murphy & Presser

[57] ABSTRACT

A variable speed transmission (1) is disclosed which has a torque converter (6) at the input of both a fixed transmission (4) which is used for low vehicle speeds and a variable transmission (5) which is used for medium and high vehicle speeds. The variable transmission (5) has a variator (11) which may be of the belt and pulley, hydraulic or electric types. The variable transmission (5) is more efficient than heretofore because power is split within the variable transmission (5) by a power split differential (9) between the variator (11) and a main power output shaft (3). Thus, the variator (11) is only called upon to handle a portion of the power when the variable transmission (5) is in operation. Thus, power losses in the variator (11) are substantially reduced.

11 Claims, 8 Drawing Sheets

RELATIVE VARIATOR SPEED, TORQUE AND POWER FROM LOW TO HIGH GEAR MODES

| | TRANSMISSION INPUT RPM T | | TRANSMISSION OUTPUT RPM T | | VARIATOR INPUT RPM T | | POWER THROUGH VARIATOR | FINAL DRIVE RPM T | | VEHICLE MPH (at 1000 rpm) |
|---|---|---|---|---|---|---|---|---|---|---|
| STARTING TO COUPLING STAGE OF TORQUE CONVERTER AND FIXED GEAR | 1000 | 1.0 | 0 to 406 | 5.36 to 2.0 | 0 to 973 | 0 | 0 | 0 to 135 | 16.1 to 6.0 | 0 to 8.68 |
| LOCK UP CLUTCH ENGAGED | 1000 | 1.0 | 406 to 500 | 2.0 | 973 to 1200 | 0 | 0 | 135 to 166 | 6.0 | 8.68 to 10.70 |
| TRANSFER STAGE TO VARIABLE TRANSMISSION | 1000 | 1.0 | 500 | 2.0 | 1200 | 0.57 | 0.69 | 166 | 6.0 | 10.70 |
| MAXIMUM RATIO OF HIGH GEAR MODE | 1000 | 1.0 | 1152 | 0.87 | 480 | 0.57 | 0.27 | 384 | 2.60 | 24.6 |

SYSTEM CHARACTERISTICS:

VARIATOR:
RANGE: 5.76 (2.41–1:2.4)
RELATIVE INPUT TORQUE: 0.57

HYDRODYNAMIC TORQUE CONVERTER:
STALL TORQUE RATIO: 2.46:1
COUPLING SPEED RATIO: 0.811:1

GEAR RATIOS:
POWER SPLIT EPICYCLIC: 1.705 (63:37)
REDUCTION GEAR: 1:0.648
FIXED GEAR (LOW GEAR MODE): 1:0.5
FINAL GEAR: 1:0.333

Fig.5

RELATIVE VARIATOR SPEED, TORQUE AND POWER FROM LOW TO HIGH GEAR MODES

| | TRANSMISSION | | HYDROSTATIC VARIATOR PUMP | | POWER THROUGH HYDROSTATIC VARIATOR | FINAL DRIVE | | VEHICLE MPH (at 1000 rpm) |
|---|---|---|---|---|---|---|---|---|
| | INPUT RPM | OUTPUT RPM T | ROTOR PUMPING SPEED RPM | T | | RPM | T | |
| STARTING TO COUPLING STAGE OF TORQUE CONVERTER AND FIXED GEAR | 1000 1·0 | 0 to 338 / 6·43 to 2·4 | 0 | 0 | 0 | 0 to 135 | 16·10 to 6·0 | 0 to 8·64 |
| LOCK UP CLUTCH ENGAGED | 1000 1·0 | 338 to 417 / 2·4 | 0 | 0 | 0 | 135 to 167 | 6·0 | 8·64 to 10·7 |
| TRANSFER STAGE TO VARIABLE TRANSMISSION | 1000 1·0 | 417 / 2·4 | 1576 | ·37 | 0·583 | 167 | 6·0 | 10·7 |
| MAXIMUM RATIO OF HIGH GEAR MODE | 1000 1·0 | 1000 / 1·0 | 0 | ·37 | LOCKED UP 0 | 400 | 2·5 | 25·6 |

SYSTEM CHARACTERISTICS:

HYDRODYNAMIC TORQUE CONVERTER:
STALL TORQUE RATIO: 2·68:1
COUPLING SPEED RATIO: 0·811:1

GEAR RATIOS:
POWER SPLIT EPICYCLIC: 1·703 (61·57)
FIXED GEAR (LOW GEAR MODES: 1:0·417
2·4:1)
FINAL GEAR: 1:0·4 (2·5:1)

Fig. 8

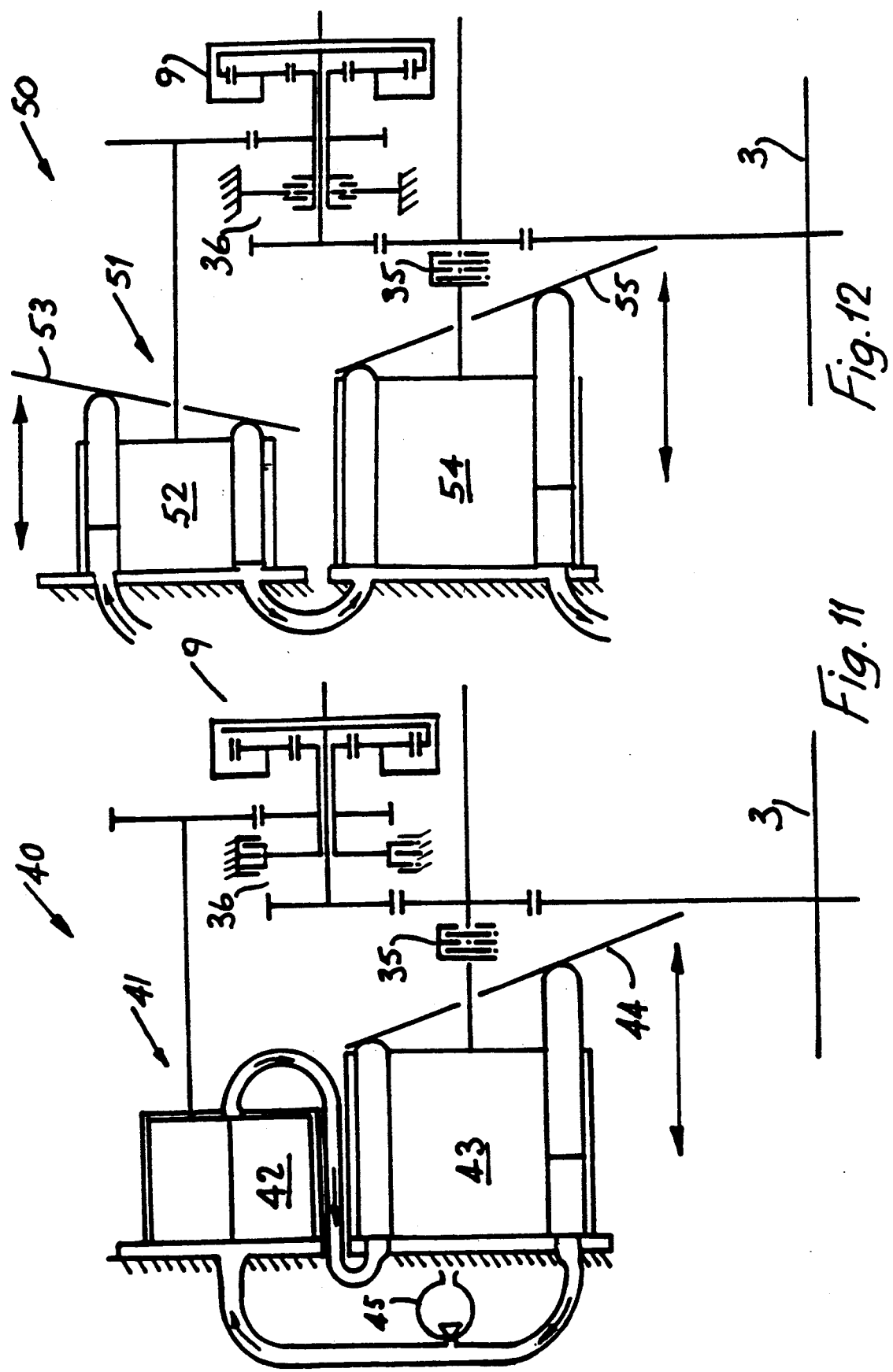

RELATIVE VARIATOR SPEED, TORQUE AND POWER FROM LOW TO HIGH GEAR MODES

| | TRANSMISSION | | HYDROSTATIC VARIATOR | | POWER THROUGH HYDROSTATIC VARIATOR | FINAL DRIVE | | VEHICLE MPH (at 1000 rpm) |
|---|---|---|---|---|---|---|---|---|
| | INPUT RPM T | OUTPUT RPM T | INPUT RPM T | | | RPM | T | |
| STARTING TO COUPLING STAGE OF TORQUE CONVERTER AND FIXED GEAR | 1000  1·0 | 0 to 541  4·02 to 1·5 | 0 | 0 | 0 | 0 to 135 | 16·1 to 6·0 | 0 to 8·64 |
| LOCK UP CLUTCH ENGAGED | 1000  1·0 | 541 to 667  1·5 | 0 | 0 | 0 | 135 to 167 | 6·0 | 8·64 to 10·67 |
| TRANSFER STAGE TO VARIABLE TRANSMISSION | 1000  1·0 | 667  1·5 | 1567 | 0·37 | 0·507 | 167 | 6·0 | 10·67 |
| MAXIMUM RATIO OF HIGH GEAR MODE | 1000  1·0 | 1567  0·63 | 0 | 0 | 0 | 397 | 2·52 | 25·4 |

SYSTEM CHARACTERISTICS:

HYDRODYNAMIC TORQUE CONVERTER:
STALL TORQUE RATIO: 2·68:1
COUPLING SPEED RATIO: 0·811:1

GEAR RATIOS:
POWER SPLIT EPICYCLIC: 1·703(63·37) :1:0·667(1·5)
FIXED GEAR (LOW GEAR MODE) :1:0·667(1·5)
FINAL GEAR: 1:0·25 (4·0:1)

Fig. 13

VARIABLE SPEED TRANSMISSION ASSEMBLY

INTRODUCTION

1. Field of the Invention

The present invention relates to variable speed transmission assemblies.

2. Prior Art

More particularly, the invention relates to variable speed transmission assemblies such as those described in British Patent specification No. 2,025,545 (Fiat) which include main power input and output shafts and two parallel power paths therebetween. One power path is through a variable transmission for normal "up-and-running" conditions. The other power path is through a fixed transmission for start-up and generally when there is a high torque requirement and low output speed. Power is transmitted to the fixed transmission via a torque converter which provides high initial torque and reduction ratios which reduce progressively until they are as close as possible to 1:1, at which stage clutches are controlled to transmit power through the variable transmission.

Such variable speed transmission assemblies suffer from the disadvantages that the variator (which controls the relative variable ratio between input and output of the assembly) is called upon to handle all of the power delivered from the main power input shaft when the variable transmission takes over from the fixed transmission. As variators are relatively inefficient, there is a significant power loss.

British Patent Specification No. GB 2,113,324 (IDC) discloses a transmission assembly which includes a heat engine and a flywheel which provide power, and an hydrostatic variator. In one mode of operation power from the heat engine and the flywheel are combined and the total power flow is split between the output shaft and the variator. In another mode of operation there are separate power flows from the flywheel and the heat engine, power from the flywheel being transmitted through the variator en route to the output shaft. Such an assembly would be inefficient at high torque operation such as at start-up because excessive power flows through the variator. Further, the assembly is complex and involves power flow through many components, in particular in the second mode of operation when power flows from the heat engine and the fly wheel are kept separate.

OBJECT OF THE INVENTION

The present invention is directed toward providing a variable speed transmission assembly having improved efficiency.

SUMMARY OF THE INVENTION

According to the invention there is provided a variable speed transmission assembly comprising:
  a main power input shaft;
  a main power output shaft;
  a variable transmission having a variator and being connected between the main power input and output shafts;
  a fixed transmission connected in parallel with the variable transmission between the main power input and output shafts;
  means for switching power between the fixed and variable transmissions;
  a torque magnification means mounted for delivery of power from the main power input shaft to the fixed transmission at start-up and low output speeds generally; and
  means in the variable transmission for splitting the input power between the variator and the main power output shaft so that the variator handles only a portion of the input power during operation of the variable transmission.

The means for splitting the input power is preferably a differential gear assembly.

In one embodiment of the invention, the differential gear assembly is an epicyclic differential. Preferably, the epicyclic differential comprises a planet carrier connected to the main power input shaft, a sun gear connected to an input shaft of the variator and an annulus connected to the main power output shaft.

In one embodiment, the variator is of the belt and pulley type. Alternatively, the variator may be of the hydraulic type. In this latter embodiment, the variator preferably comprises means for effectively locking up at vehicle cruising speeds.

In another embodiment, the hydraulic variator has a pump and a motor which are separate.

Preferably, the variable transmission includes clutch means for locking the pump input shaft and for disengaging the motor to render the hydraulic variator inactive during cruising condition.

Ideally, the variable transmission includes fixed gears providing an overdrive ratio when the hydraulic variator is inactive.

In one embodiment, the variator has an overdrive ratio.

DETAILED DESCRIPTION OF INVENTION

The invention will be more clearly understood from the following description of some preferred embodiments thereof, given by way of example only with reference to the accompanying drawings in which:

FIG. 1 is a schematic representation of a variable speed transmission assembly of the invention for which

FIG. 5 is a table illustrating operation of the assembly of FIG. 4;

FIG. 8 is a table showing operation of this assembly;

FIGS. 10, 11 and 12 are detailed views of alternative constructions of assembly incorporating an hydraulic variator having separate pump and motor units;

FIG. 13 is a table showing operating parameters of the assemblies of FIGS. 10, 11 and 12;

Figure 1:
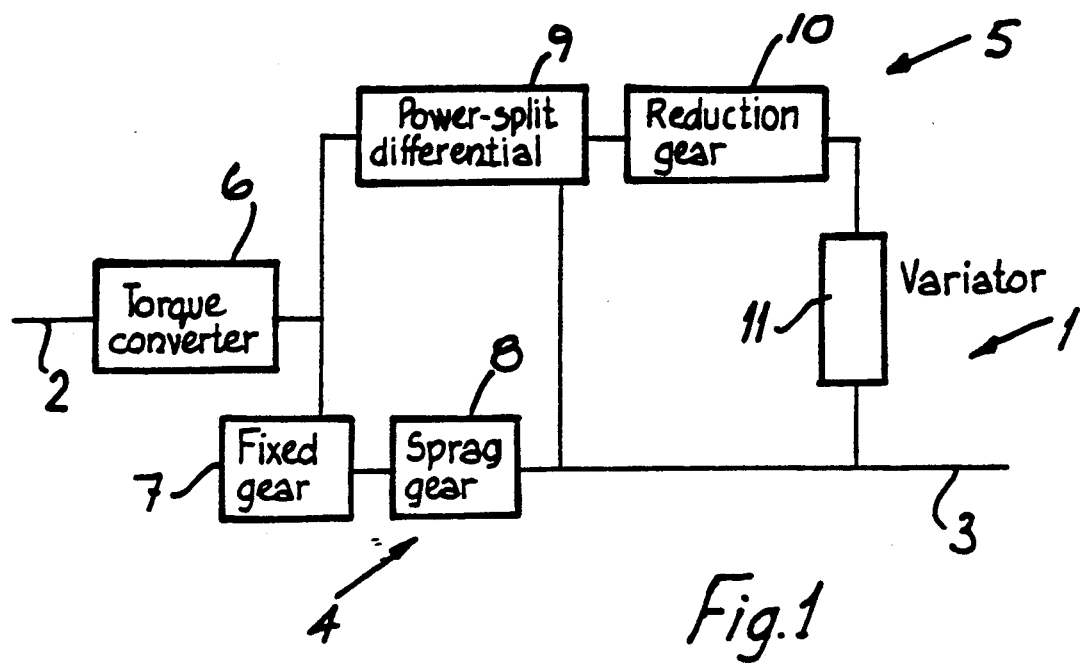
Figure 2:
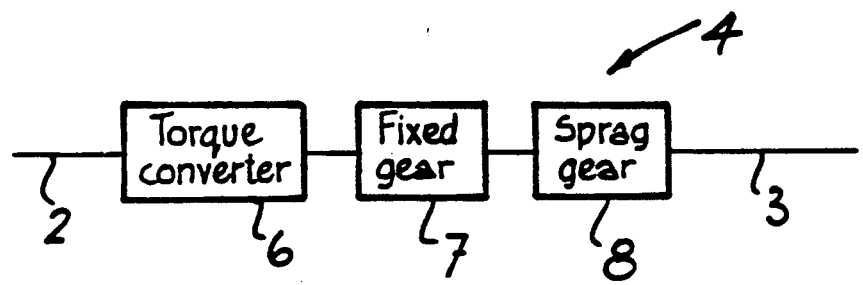
FIG. 2 shows the power path of the assembly at low output speeds and FIG. 3 shows the power path for medium and high output speeds.
Figure 3:
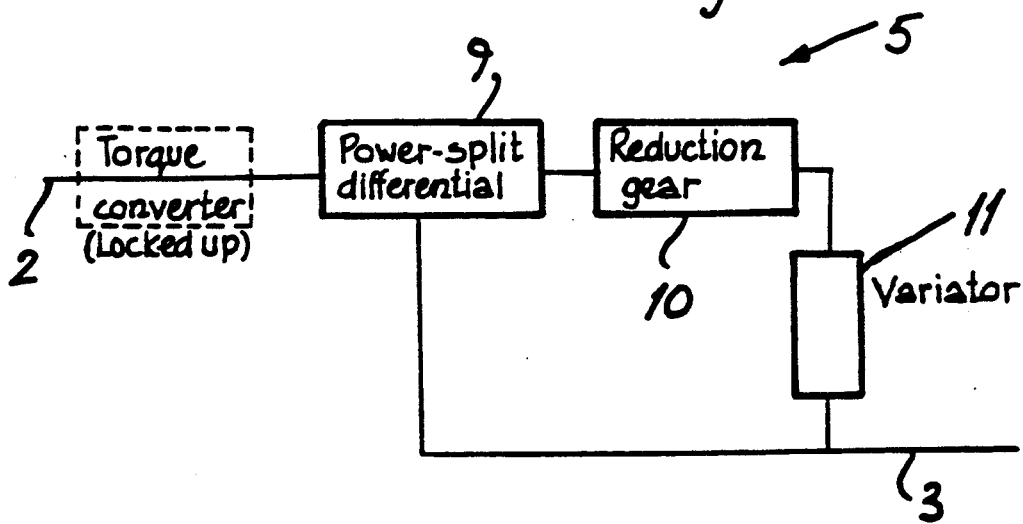

Referring to the drawings, and initially to FIGS. 1 to 3 there is illustrated a variable speed transmission assembly of the invention, indicated generally by the reference numeral 1. The assembly 1 comprises a main power input shaft 2 for connection with the vehicle engine, and a main power output shaft 3 for connection with the wheels.

The main power input shaft 2 is connected to a torque converter 6 which is in turn connected to a fixed transmission 4, namely, a fixed gear train 7 and a sprag gear 8. The output of the sprag gear 8 is connected to the main power output shaft 3.

In parallel with the fixed transmission, the assembly 1 comprises a variable transmission 5, namely, a power split differential 9, a reduction gear 10, and a variator 11. One output from the power split differential 9 is connected directly to the main power output shaft 3, while the second output is connected to the reduction gear 10, which is in turn connected to the variator 11. The output of the variator 11 is connected to the main power output shaft 3.

In operation, at start-up and low wheel speeds generally, the torque convertor 6 magnifies the torque of the main power input shaft 2 to drive the fixed gear train 7. The sprag gear 8 delivers this power to the main power output shaft 3. Thus, as illustrated in FIG. 2, the torque converter 6 and the fixed transmission 4 handle all of the power.

As speed of the main power output shaft 3 increases, torque magnification of the torque convertor 6 progressively decreases. Simultaneously, as the output speed of the variator 11 increases, the stage is reached when the output of the fixed gear train 7 is left idling because of the sprag gear 8 and power is transmitted through the variable transmission 5, as illustrated in FIG. 3. However, even when the variable transmission 5 is transmitting all of the power, only a portion of the power is transmitted through the variator 11. This is because the differential 9 splits the power between the main power output shaft 3 and the variator 11. Accordingly, efficiency of the assembly 1 is significantly improved because power losses in the variator are considerably reduced. Further, wear and tear of the variator 11 is significantly reduced because at medium and high speeds it only handles portion of the power, and of course none of the power at low speeds.

Figure 4:
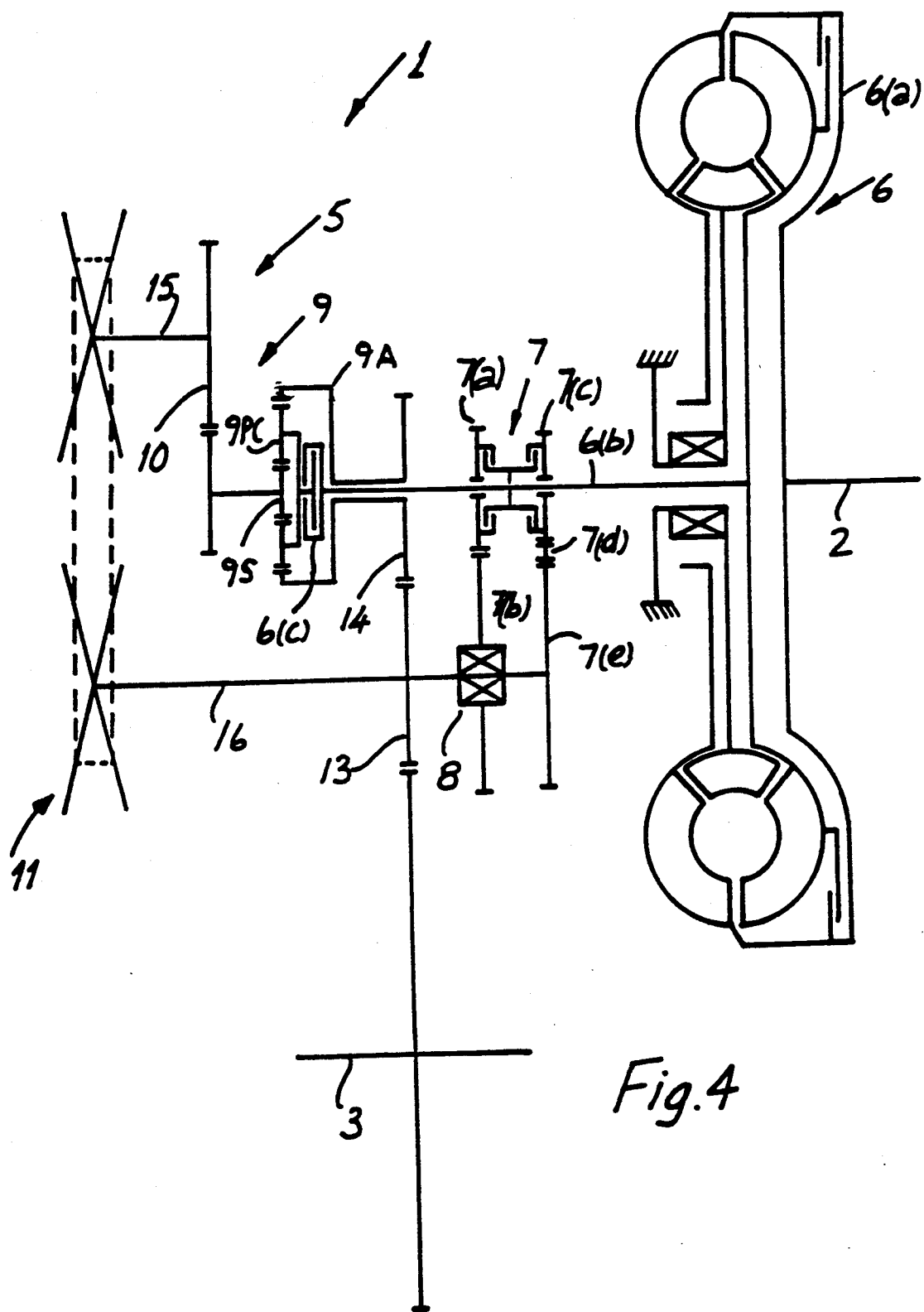
FIG. 4 is a detailed view of the variable speed transmission assembly shown in outline form in FIG. 1.

Referring now to FIG. 4 the assembly 1 is illustrated in more detail. The torque convertor 6 includes a lock-up clutch 6(a), and an output shaft 6(b) terminating in a clutch 6(c). The output shaft 6(b) is connectable via a clutch to a forward gear 7(a) meshing with a gear 7(b) on the sprag gear 8. The torque convertor output shaft 6(b) is also connectable by a clutch to a reverse gear 7(c), which meshes with an idler gear 7(d), which in turn meshes with a gear 7(e) secured to the shaft 16.

The power split differential 9 is an epicyclic gear unit comprising a sun gear 9S, a planet carrier 9PC and associated planet gears, and an annulus 9A. The variator 11 is of the belt and pulley type.

The output of the sprag gear 8 is secured to a gear 13 which meshes with a gear fast on the main power output shaft 3. The annulus 9A of the power split differential 9 is secured to a gear 14 which meshes with the gear 13 to allow the annulus to directly drive the main power output shaft 3. The shaft and output gear of the sun gear 9S meshes with the reduction gear 10 which is fast on an input shaft 15 of the variator 11. The output shaft 16 of the variator 11 is secured to the gear 13 which drives the main power output shaft 3.

In operation, at start-up and low wheel speeds generally, for forward motion power is transmitted through the torque convertor 6, the output shaft 6(b), the forward gear 7(a) and then through the sprag gear 8 to the main power output shaft 3. On starting, the torque convertor 6 gives a torque magnification of 2.68:1 and the forward gear 7(a) and the gear 7(b) give a further torque magnification and speed reduction of 2:1, thereby giving a total torque magnification on starting of 5.36:1. As the vehicle accelerates, the torque magnification requirement progressively decreases, which in turn allows the speed of the shaft 6(b) to increase relative to the main power input shaft 2 until the coupling speed of the torque converter is reached. When this happens, the lockup clutch 6(a) is automatically engaged and the engine drives the shaft 6(b) in a direct 1:1 relationship through the lock-up up clutch 6(a). At this stage the clutch 6(c) is automatically engaged and power is thus transmitted into the variable transmission 5. With the variator now at its lowest ratio (2.4:1) the two output gears 13 and 14 synchronise with the speed of the gear 7(b) and the sprag gear 8. The speed ratio between the main power input shaft 2 and the shaft 16 and the gear 13 is now 2:1. The variator ratio is now automatically expanded and the variable transmission 5 thus takes over transmission of all the engine power and the fixed gear train 7 is left in an idling state at the sprag gear 8.

At this stage, all of the engine power is received at the planet carrier 9PC as an input to the power split differential 9. This input power is split between the sun gear 9S and the annulus gear 9A. The sun gear 9S drives the input of the variator 11 via the reduction gear 10. The output of the variator 11 drives into the main power output shaft 3 via the shaft 16 and the gear 13. In parallel with this, the annulus gear 9A also drives the main power output shaft 3 through the gears 14 and 13. Accordingly, the variator 11 is required to handle only a portion of the total input power. Further, the initial input speed of the variator 11 is relatively low because the variable transmission 5 only takes over when a reasonable output speed has been attained and further, the reduction gear 10 reduces the input speed. Changing and controlling the variator from its lowest to its highest ratio automatically controls the complete transmission assembly from a point where the variable ratio system takes over up to the highest gear mode.

The table of FIG. 5 gives an illustration of the advantages which are achieved by the invention. It will be immediately apparent that the variator 11 does not handle torque in the most strenuous conditions of start-up and when the output torque ratio may be in the range of 16:1 to 6:1. The maximum proportion of input torque handled by the variator input is 57%. Further, the maximum speed of the variator input or output never exceeds 120% of the engine speed and this progressively reduces to 48% at variator input in the highest gear mode. Also, only 27% of the engine power is transmitted through the variator during the highest gear mode. Accordingly, because the variator 11 only handles this proportion of the total power, a reduced size of variator may be used. Further because the speeds and torques required of the variator 11 are relatively low, durability of the assembly is significantly improved because of less wear of the belts and pulleys. Fuel economy is also helped by the fact that the variator 11 provides an overdrive ratio for cruising conditions. Because the torque converter 6 only acts during low speeds, continuous operation is not required and it is envisaged that a simple design of torque magnification unit which would not be suitable for continuous running would be sufficient.

It is also envisaged that other torque magnification means such as an hydraulic coupling device, an electrical coupling device or any other suitable device could be used.

It will be appreciated from reference to the table of FIG. 5, that the assembly of the invention simultaneously solves two major problems which arise in variable ratio transmission assemblies generally. One problem is that of the high torque requirement at starting and low speeds generally which causes overloading of the variator, and in particular for those of the V-belt type, slipping of the belts. This is solved by use of the fixed transmission. The second problem is high speed operation of the variator at high vehicle speeds which causes considerable wear of the variator. This latter problem is solved by splitting the power between the variator and the main power output shaft so that there is an inverse relationship between vehicle speed and variator input speed. In addition, of course there is a considerable improvement in efficiency because the power through the variator reaches as low as 27% of the total power at cruising speeds. It will thus be appreciated that the assembly of the invention is a major improvement over the prior art and effectively multiplies rather than adds advantages of prior art assemblies. This has been achieved in a simple way, using components which have been available for a considerable time, thus indicating non-obviousness of the invention. Existence of inventive step is further supported by the fact that the Fiat and IDC prior art assemblies were published in 1980 and 1983 and we believe that in view of the major advantages of the invention, that it would have been carried out before 1990 if it were obvious. Indeed it appears that there would have been a technical prejudice against splitting power before input to the variator in a transmission of the Fiat type because such power splitting arrangements would have been regarded as being useful only for relatively complex assemblies where there is a number of inputs, such as from a heat engine and a flywheel, as shown in the IDC Specification. There is no suggestion or hint in either of the Fiat or the IDC specifications toward the present invention and this further supports non-obviousness of the invention.

Figure 6:
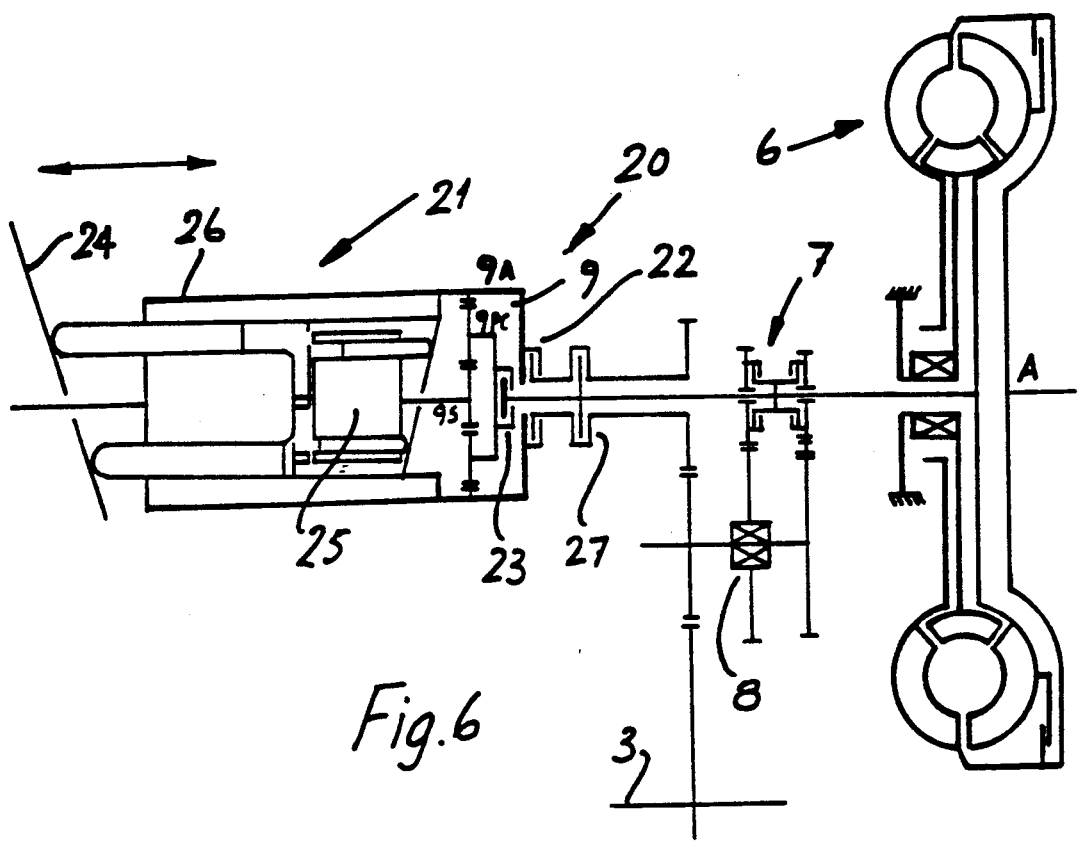
FIG. 6 is a schematic representation of the power path for medium and high output speeds of an assembly incorporating an hydraulic variator of the Badalini type.
Figure 7:
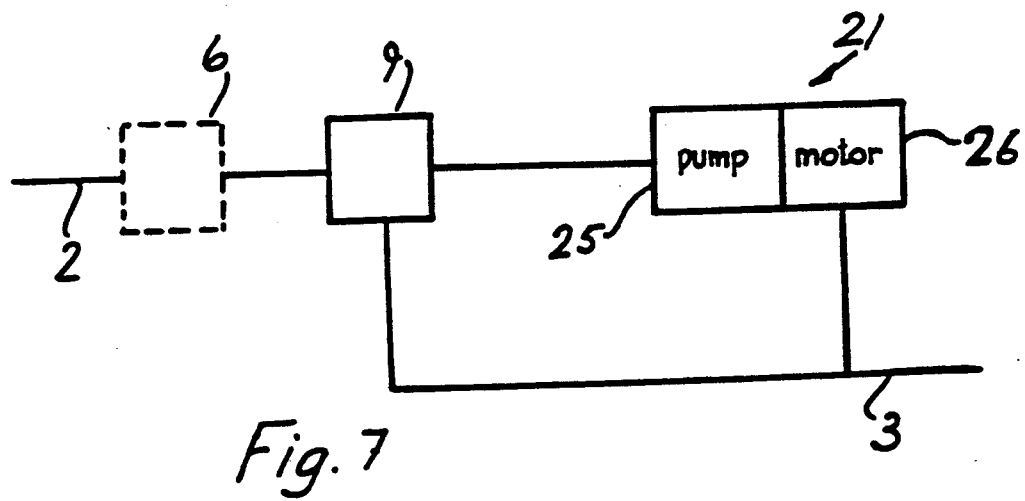
FIG. 7 is a detailed view of an assembly incorporating an hydraulic variator of the Badalini type.

Referring now to FIG. 6, there is illustrated an assembly 20 of the invention which incorporates an hydraulic variator 21 similar to that described in United Kingdom Patent Specification No. 765,081 (Badalini), hereinafter referred to as a Badalini variator. The power path for this assembly for medium and high vehicle speeds is illustrated in FIG. 7. Parts similar to those described with reference to the previous drawings identified are identified by the same reference numerals. The power split differential 9 has a clutch 22 at the output of the annulus 9A and a clutch 23 at the input of the planet carrier 9PC. The annulus 9A is secured to a variable speed motor having a swash plate 24, and the sun gear 9S is connected to the rotor of a fixed swash plate hydraulic pump 25. The rotor of the hydraulic pump 25 rotates within a housing which is the body of the rotor of an hydraulic motor 26. A clutch 27 is also connected between the planet carrier 9PC and the annulus 9A. In operation, rotation of the sun gear 9S causes oil to be pumped into the hydraulic motor 26. The reaction torque of the rotor is fed back into the pump motor through the planet gears of the differential 9. This torque is transferred to the annulus 9A. On initial starting when high torque is required, the angle of the swash plate 24 is set at its highest value and this permits the motor 26 to operate at the highest torque value. The motor 26, therefore, rotates at a slower speed than the pump rotor 25. To increase the output shaft speed the angle of the swash plate 24 is decreased, thus reducing travel of the pistons of the motor 26. When this happens, the motor rotor cannot handle the volume of oil being pumped by the pump 25 and is forced to turn faster as the hydraulic pressure between the pump 25 and the motor 26 builds up. Accordingly, the pressure that builds up in the pump 25 is transferred as extra torque to the annulus 9A and thus to the main power output shaft 3 from the sun gear 9S via the planet gears. Further, the speed of the sun gear 9S and the pump 25 decrease as the speed of the annulus 9A and the main power output shaft 3 increase. By progressively decreasing the angle of the swash plate 24, the speed of the main power output shaft 3 is progressively increased until the top speed ratio is reached. At this point the motor piston's stroke is reduced to zero and it effectively locks up the pump 25. The pump 25 and the motor 26 now rotate as one unit which means that the power split differential 9 is locked up and the output shaft rotates at the same speed as the input shaft. Accordingly, there is no power loss in the variator during cruising conditions, further improving efficiency of the assembly 20. By now disengaging the clutches 22 and 23, and engaging the clutch 27, the variator 21 may be disengaged from the variable transmission during cruising conditions.

Referring now to FIG. 8, there is illustrated a table showing operation of the assembly 20. It will be noted that the variator 21 is required to handle only 37% of the input torque and only 58% of the input power at the initial changeover to the mid to high speed range. Further, no power is transmitted through the variator at the high ratio modes.

Figure 9:
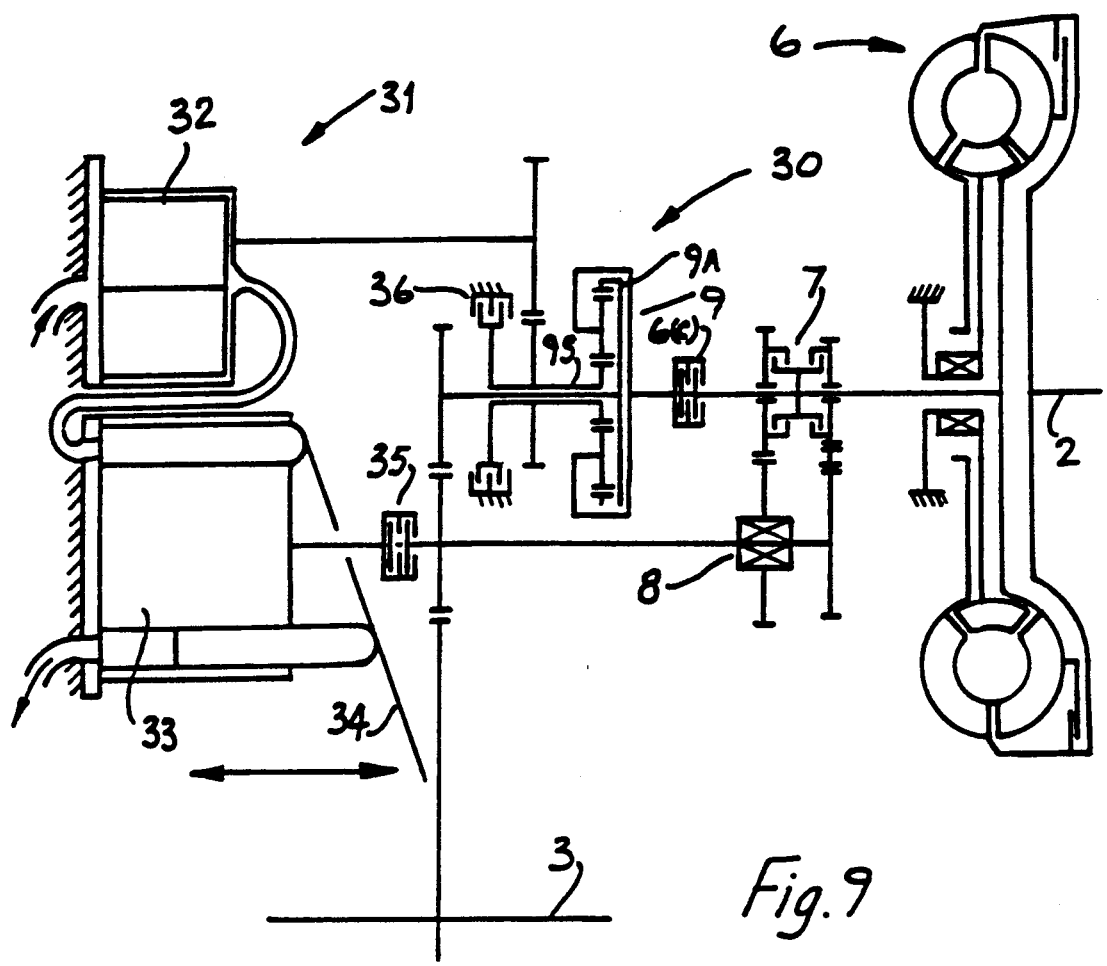
FIG. 9 is a schematic representation of the power path for an assembly incorporating an hydraulic variator having separate pump and motor units.
Figure 10:
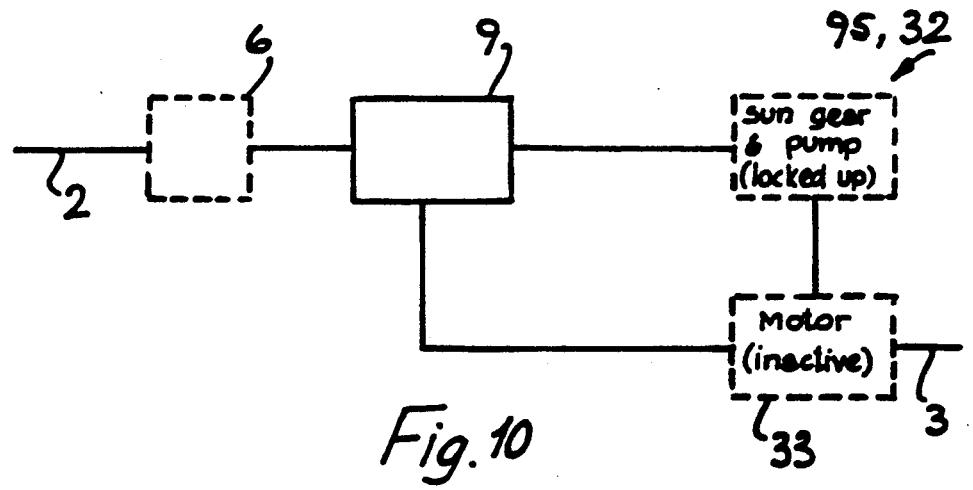

Referring now to FIG. 9, there is illustrated an assembly 30 incorporating an hydraulic variator 31 having separate pump and motor units. Again, parts similar to those described with reference to the previous drawings are identified by the same reference numerals. The hydraulic variator 31 has a fixed displacement pump 32 driven by the sun gear 9S of the power split differential 9. A separate variable speed motor 33 having a swash plate 34 is provided to complement the power of the annulus 9A. The output of the motor 32 is connected to the main power output shaft 3 via a clutch 35. An open circuit hydraulic system is used whereby the pump 32 takes fluid from the holding tank and the motor 33 returns the fluid to the tank. A clutch 36 is connected at the output of the sun gear 9S.

In operation, as with the hydraulic variator of the Badalini type, the variable speed of the transmission is controlled by varying the inclination of the swash plate 34 until the highest gear ratio is almost reached (typically between 80% to 90% of the full top gear). At this stage, the pump 32 and the sun gear 9S are locked up by engaging the clutch 36 and at the same time disengaging the clutch 35. This completely eliminates the pump and motor from transmitting any power and they remain static. The transmission assembly is now operating at its highest gear mode as the annulus 9A is transmitting the total power in a very efficient manner at an overdrive ratio of 1 to 1.587 ((6(b) to 9A), further improving fuel efficiency.

Referring now to FIGS. 11 and 12, there are illustrated portions of alternative assemblies of the invention, indicated generally by the reference numerals 40 and 50, respectively. Again, parts similar to those with reference to the previous drawings are identified by the same reference numerals. In FIG. 11, there is an hydraulic variator 41 having a pump 42 connected to a motor 43 having a swash plate 44. The main differences between the assemblies 30 and 40 are that the assembly 40 operates with a closed circuit hydraulic system in which the outlet from the motor 43 goes directly to the inlet of the pump 42. A make-up pump 45 is included which replenishes any leakage in the closed circuit.

In FIG. 12, the assembly 50 includes an hydraulic variator 51 with a pump 52 of the swash plate variable displacement type having a swash plate 53. The pump 52 is connected to a motor 54 having a swash plate 55.

It will be appreciated that in general by using an hydraulic variator, a smaller variator is required to transmit a given torque and power. Further, control of an hydraulic variator is much simpler.

With an hydraulic variator of the Badalini type, in the high gear mode when the pump and the motor are not transferring any power, the pump and motor rotate together and are thus locked-up. This considerably improves efficiency because the variator acts as a fixed transmission.

However, with an hydraulic variator having separate pump and motor units, the pump and motor units are declutched from the assembly and remain static, allowing the variable transmission to operate as an efficient mechanical overdrive unit. Because an overdrive may be achieved by appropriate choice of gearing, efficiency at cruising conditions is even better than with an hydraulic variator of the Badalini type. This is illustrated in FIG. 13. It will be noted that only 37% of the input torque is handled by the variator at transfer to the variable transmission. An important advantage of the assemblies 30, 40, and 50 is the fact that a motor having a maximum torque capacity of only 0.87T is required. This is evident from the "Transmission Output, T" column in FIG. 13 for the "Transfer Stage to Power Split Transmission". This shows that a torque of 1.5T is transmitted by the variable transmissions at transfer stage. The annulus of the differential in each assembly contributes 0.63T, which leaves the motor only having to transmit 0.87T, even when it is working at its highest torque value. Further, the variator does not handle any torque at cruising conditions. It will also be noted that 159% of the input speed is achieved at the high gear mode as opposed to 100% for the Badalini variator. This is possible because with the separate pump and motor, a wider ratio range may be provided giving an overdrive and it is then possible to have a larger final drive reduction (4:1, compared to 3:1 for the V-belt and 2.5:1 for the Badalini types).

Instead of hydraulic or belt and pulley variators, it is envisaged that an electric variator having a separate generator and motor may be used, in which the sun gear shaft and the generator are static and the motor is inactive in the highest gear mode. Alternatively, the generator and motor may be incorporated in the one unit. In the highest mode of gear, the generator and motor unit would be locked-up and revolve as one unit. It will be appreciated that this is analogous to the corresponding types of hydraulic variator.

I claim:

1. A variable speed transmission assembly comprising:
    a main power input shaft;
    a main power output shaft;
    a variable transmission having a variator and being connected between the main power input and output shafts;
    a fixed transmission connected in parallel with the variable transmission between the main power input and output shafts;
    means for switching power between the fixed and variable transmissions;
    a torque magnification means mounted for delivery of power from the main power input shaft to the fixed transmission at start-up and low output speeds generally; and
    means in the variable transmission for splitting the input power between the variator and the main power output shaft so that the variator handles only a portion of the input power during operation of the variable transmission.

2. An assembly as claimed in claim 1, wherein the means for splitting the input power is a differential gear assembly.

3. An assembly as claimed in claim 2, wherein the differential gear assembly is an epicyclic differential.

4. An assembly as claimed in claim 3, wherein the epicyclic differential comprises a planet carrier connected to the main power input shaft, a sun gear connected to an input shaft of the variator and an annulus connected to the main power output shaft.

5. An assembly as claimed in claim 1, wherein the variator is of the belt and pulley type.

6. An assembly as claimed in claim 1, wherein the variator is an hydraulic variator.

7. An assembly as claimed in claim 6, wherein the variator comprises means for effectively locking up at vehicle cruising speeds.

8. An assembly as claimed in claim 6, wherein the hydraulic variator has a pump and a motor which are separate.

9. An assembly as claimed in claim 8, wherein the variable transmission includes clutch means for locking the pump input shaft and for disengaging the motor to render the hydraulic variator inactive during cruising condition.

10. An assembly as claimed in claim 9, wherein the variable transmission includes fixed gears providing an overdrive ratio when the hydraulic variator is inactive.

11. An assembly as claimed in claim 1, wherein the variator has an overdrive ratio.

* * * * *